(12) United States Patent
Archambault et al.

(10) Patent No.: US 8,191,057 B2
(45) Date of Patent: May 29, 2012

(54) SYSTEMS, METHODS, AND COMPUTER PRODUCTS FOR COMPILER SUPPORT FOR AGGRESSIVE SAFE LOAD SPECULATION

(75) Inventors: Roch G. Archambault, North York (CA); Geoffrey O. Blandy, Austin, TX (US); Roland Froese, Toronto (CA); Yaoqing Gao, North York (CA); Liangxiao Hu, Markham (CA); James L. McInnes, Toronto (CA); Raul E. Silvera, Woodbridge (CA)

(73) Assignee: International Business Machines Corporation, Armonk, NY (US)

( * ) Notice: Subject to any disclaimer, the term of this patent is extended or adjusted under 35 U.S.C. 154(b) by 1310 days.

(21) Appl. No.: 11/845,491

(22) Filed: Aug. 27, 2007

(65) Prior Publication Data
US 2009/0064119 A1  Mar. 5, 2009

(51) Int. Cl.
   G06F 9/45    (2006.01)
   G06F 9/44    (2006.01)
(52) U.S. Cl. ........................ 717/161; 712/241
(58) Field of Classification Search ............... None
   See application file for complete search history.

(56) References Cited

U.S. PATENT DOCUMENTS

| | | | |
|---|---|---|---|
| 5,577,200 A | | 11/1996 | Abramson et al. |
| 5,892,936 A | | 4/1999 | Tran et al. |
| 5,901,318 A | * | 5/1999 | Hsu .................. 717/161 |
| 5,987,561 A | | 11/1999 | Witt et al. |
| 6,189,068 B1 | | 2/2001 | Witt et al. |
| 6,526,572 B1 | | 2/2003 | Brauch et al. |
| 6,775,765 B1 | * | 8/2004 | Lee et al. ................. 712/241 |
| 6,832,370 B1 | * | 12/2004 | Srinivasan et al. ......... 717/161 |
| 6,912,709 B2 | * | 6/2005 | Helder et al. .............. 717/161 |
| 6,948,160 B2 | * | 9/2005 | Click et al. ................. 717/148 |
| 7,337,439 B1 | * | 2/2008 | Johnson et al. ............ 717/161 |
| 2003/0233643 A1 | * | 12/2003 | Thompson et al. ......... 717/161 |
| 2004/0015916 A1 | * | 1/2004 | Click et al. ................. 717/150 |
| 2005/0283772 A1 | * | 12/2005 | Muthukumar et al. ..... 717/151 |
| 2006/0080642 A1 | * | 4/2006 | Ogawa et al. ............... 717/126 |

OTHER PUBLICATIONS

Nayani, A., and Gorman, M., and de Castro, R. Memory Management in Linux. May 25, 2002. pp. 27-32. [retrieved on May 20, 2011]. Retrieved from the Internet: <URL: www.ecsl.cs.sunysb.edu/elibrary/linux/mm/mm.pdf>.*

(Continued)

Primary Examiner — Tuan Dam
Assistant Examiner — Geoffrey St Leger
(74) Attorney, Agent, or Firm — Cantor Colburn LLP; Libby Toub

(57) ABSTRACT

Systems, methods and computer products for compiler support for aggressive safe load speculation. Exemplary embodiments include a method for aggressive safe load speculation for a compiler in a computer system, the method including building a control flow graph, identifying both countable and non-countable loops, gathering a set of candidate loops for load speculation, and for each candidate loop in the set of candidate loops gathered for load speculation, computing an estimate of the iteration count, delay cycles, and code size, performing a profitability analysis and determining an unroll factor based on the delay cycles and the code size, transforming the loop by generating a prologue loop to achieve data alignment and an unrolled main loop with loop directives, indicating which loads can safely be executed speculatively and performing low-level instruction scheduling on the generated unrolled main loop.

2 Claims, 2 Drawing Sheets

OTHER PUBLICATIONS

Mahadevan, U. et al., Applying Data Speculation in Modulo Scheduled Loops, International Conference on Parallel Architectures and Compilation Techniques, 2000, pp. 169-176, [retrieved on Jan. 17, 2012], Retrieved from the Internet: <URL:http://ieeexplore.ieee.org/>.*

Larsen, S. et al., Increasing and Detecting Memory Address Congruence, International Conference on Parallel Architectures and Compilation Techniques, 2002, [retrieved on Jan. 18, 2012], Retrieved from the Internet: <URL:http://ieeexplore.ieee.org/>.*

Muthukumar, K., et al., Software Pipelining of Loops with Early Exits for the Itanium Architecture, Proceedings of the First Workshop on EPIC Architectures and Compiler Technology (EPIC-1), Austin, TX, Dec. 2001, [retrieved on Jan. 18, 2012], Retrieved from the Internet: <URL: http://citeseerx.ist.psu.edu/index>.*

Das et al., "Performance of Runtime Optimization on BLAST", Proceedings of the International Symposium on Code Generation and Optimization (CGO'05).

Reinman et al., "Predictive Techniques for Aggressive Load Speculation", Proceedings of the Annual 31st International Symposium on Microarchitecture, Dec. 1998.

Rauchwerger et al., "The LRPD Test: Speculative Run-Time Parallelization of Loops with Privatization and Reduction Parallelization", SIGPLAN '95 La Jolla, CA USA.

Brown et al., "Compiler-Based I/O Prefetching for Out-of-Core Applications", ACM Transactions on Computer Systems, vol. 19, No. 2, May 2001, pp. 111-170.

Yardimci et al., "Dynamic Parallelization and Mapping of Binary Executables on Hierarchical Platforms", CF'06, May 3-5, Ischia, Italy.

* cited by examiner

SYSTEMS, METHODS, AND COMPUTER PRODUCTS FOR COMPILER SUPPORT FOR AGGRESSIVE SAFE LOAD SPECULATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to compilers and instruction scheduling, and particularly to systems, methods and computer products for compiler support for aggressive safe load speculation.

2. Description of Background

Modern microprocessors are generally designed with deep computing pipelines. For this reason, special techniques are needed to more fully utilize chip resources. One such technique is speculative execution. For example, for code such as:

```
while (*p != 's')
    p++;
``` for which the corresponding machine code is generated is:

```
CL.3:
    AI      gr3=gr3,1
    LIZ     gr0,gr4=(*)uchar(gr4,0)
    C4      cr0=gr0,115
    BF      CL.3,cr0,0x4/eq ,taken=80%(80,20)
```

There are several delay cycles in the sequence of load, compare and branch instructions. The amount of delay depends on the particular microprocessor. For example, certain machines have three delay cycles from a load instruction to a compare instruction, and three delay cycles from a compare instruction to a branch instruction.

Simply unrolling a loop such as:

```
CL.52:
    LIZU    gr0,gr3=(*)uchar(gr3,1)
    C4      cr0=gr0,115
    BT      CL.6,cr0,0x4/eq ,taken=20%(20,80)
    LIZU    gr0,gr3=(*)uchar(gr3,1)
    C4      cr0=gr0,115
    BT      CL.6,cr0,0x4/eq ,taken=20%(20,80)
    LIZU    gr0,gr3=(*)uchar(gr3,1)
    C4      cr0=gr0,115
    BT      CL.6,cr0,0x4/eq ,taken=20%(20,80)
    LIZU    gr0,gr3=(*)uchar(gr3,1)
    C4      cr0=gr0,115
    BF      CL.52,cr0,0x4/eq ,taken=80%(80,20)
CL.6:
``` cannot improve the performance since load instructions cannot usually be safely reordered with branch instructions. Otherwise a violation exception may occur at run time.

What is needed is a compiler to perform aggressive load speculation safely.

SUMMARY OF THE INVENTION

Exemplary embodiments include a method for aggressive safe load speculation for a compiler in a computer system, the method including building a control flow graph, identifying both countable and non-countable loops, gathering a set of candidate loops for load speculation, for each candidate loop in the set of candidate loops gathered for load speculation performing computing an estimate of the iteration count, delay cycles, and code size, performing a profitability analysis and determine an unroll factor based on the delay cycles and the code size, transforming the loop by generating a prologue loop to achieve data alignment and an unrolled main loop with loop directives, indicating which loads can safely be executed speculatively and performing low-level instruction scheduling (or aggressive safe load speculation) on the generated unrolled main loop.

Further exemplary embodiments include a system for aggressive safe load speculation for a compiler, the system including a computer processor having a memory coupled to the compiler, a process residing in the memory having instructions for building a control flow graph, identifying both countable and non-countable loops, gathering a set of candidate loops for load speculation, for each candidate loop in the set of candidate loops gathered for load speculation performing computing an estimate of the iteration count, delay cycles, and code size, performing a profitability analysis and determine an unroll factor based on the delay cycles and the code size, transforming the loop by generating a prologue loop to achieve data alignment and an unrolled main loop with loop directives, indicating which loads can safely be executed speculatively and performing low-level instruction scheduling on the generated unrolled main loop, wherein a loop with an early exit is a candidate loop for load speculation, and for a loop with early exit and with unit-stride accesses of a contiguous storage, performing determining whether a storage accessed by a first load has an alignment greater than its own data element size, determining whether the alignment amount is less than the size of one memory page and responsive to a determination that the storage accessed by the first load has an alignment greater than its own data element size and that the alignment amount is less than the size of one memory page, generating a pre-loop having a number of iterations of the original loop so that when the original loop is executed, the data for the first load is strongly aligned in storage so that the main loop can be unrolled and the first load has strong enough alignment so that all of the subsequent loads in that unrolled iteration can be safely executed ahead of all of the early exit branches in that iteration.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides a compiler system and method to do aggressive load speculation safely for a loop with an early exit and with unit stride access of a contiguous storage.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
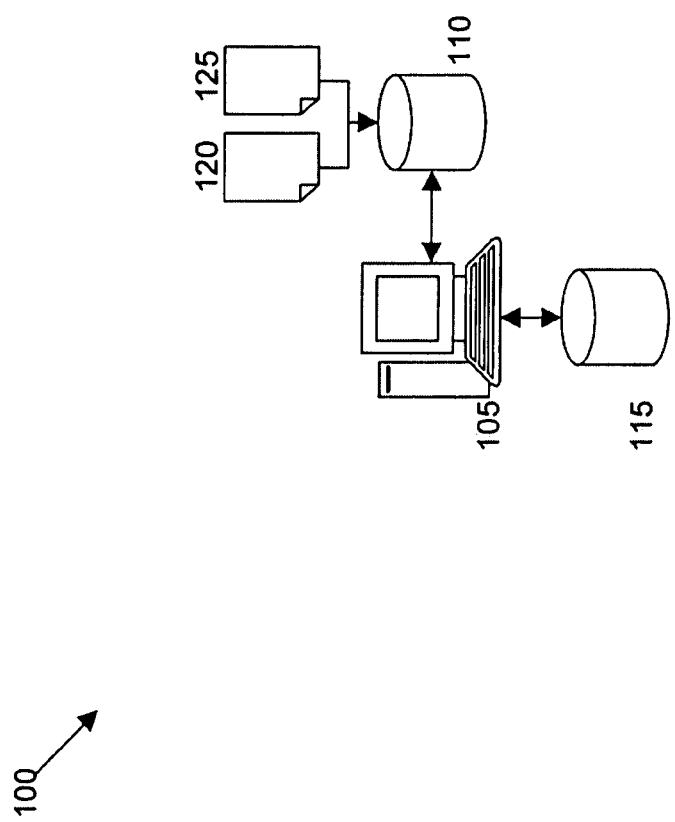
FIG. 1 illustrates an exemplary system for compiler support for aggressive safe load speculation.

Turning now to the drawings in greater detail, FIG. 1 illustrates an exemplary system 100 for compiler support for aggressive safe load speculation. In exemplary embodiments, the system 100 includes a processing device 105 such as a computer, which includes a storage medium or memory 110. The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processing device 105.

A data repository 115 is coupled to and in communication with the processing device 105. The system 100 can further include a compiler 120. The compiler 120 can be any computer program (or set of programs) that translates text written in a computer language (the source language) into another computer language (the target language). The original sequence is usually called the source code and the output called object code. The system 200 can further include process 125 for compiler support for aggressive safe load speculation, as further discussed herein.

Exemplary embodiments include compiler systems and methods that perform aggressive load speculation safely. In exemplary embodiments, for an unrolled loop with unit stride accesses of a contiguous storage, if a leading load with data element size DSize is aligned with Alignment (in bytes), bigger than its data element size, then there are (Alignment/DSize −1) subsequent data accesses, which are safe for load speculation. Loads can be also speculated without alignment check if we can approve all accesses within a page. For the above example where

```
while (*p != 's')
    p++;
``` if the first load is word aligned and the date element size is one byte, the loop can be unrolled by 4 as shown by:

```
while (*p != 's') {
    p++;
    if (*p == 's' ) break;
    p++;
    if (*p == 's' ) break;
    p++;
    if (*p == 's' ) break;
    p++;
``` and the loads:

```
CL.52:
        LIZU    gr0,gr3=(*)uchar(gr3,1)
        C4      cr0=gr0,115
        BT      CL.6,cr0,0x4/eq ,taken=20%(20,80)
        LIZU    gr0,gr3=(*)uchar(gr3,1)
        C4      cr0=gr0,115
        BT      CL.6,cr0,0x4/eq ,taken=20%(20,80)
        LIZU    gr0,gr3=(*)uchar(gr3,1)
        C4      cr0=gr0,115
        BT      CL.6,cr0,0x4/eq ,taken=20%(20,80)
        LIZU    gr0,gr3=(*)uchar(gr3,1)
        C4      cr0=gr0,115
        BF      CL.52,cr0,0x4/eq ,taken=80%(80,20)
CL6:
``` can be safely speculated.

In exemplary embodiments, the alignment can be checked through code versioning given by:

```
if (p% 4 == 0) {
        while (*p != 's') {
            p++;
            if (*p == 's' ) break;
            p++;
            if (*p == 's' ) break;
            p++;
            if (*p == 's' ) break;
            p++;
        }
} else {
        while (*p != 's')
            p++;
}
```

In exemplary embodiments, there are two kinds of load speculation. If a load instruction is reordered with a branch it is called control speculation. Reordering with a store instruction is called data speculation. Data speculation depends on some kind of prediction, and allows the speculative execution of a chain of dependent instructions. On a mis-prediction, a recovery mechanism must reissue those instructions. Some instruction set architectures provide hardware support for such recovery mechanisms. In exemplary embodiments, a compiler method for safe control speculation without any recovery mechanism is provided. Using both high and low-level compiler transformations, compact code can be generated that improves performance by executing loads speculatively, in which performance improvement is realized. For example, several times speed up could be obtained for some small kernel code, and around 14% performance improvement is obtained for spec2006/xalancbmk at O3-qhot.

In exemplary embodiments, for a loop with early exit and with unit-stride accesses of a contiguous storage, a determination is made whether the storage accessed by the first load has an alignment greater than its own data element size and whether the alignment amount is less than the size of one memory page (usually 4096 bytes). Responsive to a determination that the storage accessed by the first load has an alignment greater than its own data element size and that the alignment amount is less than the size of one memory page, a pre-loop having exactly enough iterations of the original loop is generated so that when the main (original) loop is executed the data for the first load is strongly aligned in storage so that the main loop can be unrolled and the first load has strong enough alignment so that all of the subsequent loads in that unrolled iteration can be safely executed ahead of all of the early exit branches in that iteration.

As discussed above, in exemplary embodiments, the compiler systems and methods described herein perform aggressive load speculation safely for a loop with early exit and with unit-stride accesses of a contiguous storage. In exemplary embodiments, if the storage accessed by the first load has an alignment greater than its own data element size, then subsequent loads that access the same aligned block are safe to speculate, which is true as long as the alignment amount is less than the size of one memory page (usually 4096 bytes).

In exemplary embodiments, in a pre-loop exactly enough iterations of the original loop are performed so that when the main loop is executed the data for the first load is strongly aligned in storage. Thus, the main loop can be unrolled and the first load has strong enough alignment so that all of the subsequent loads in that unrolled iteration can be safely executed ahead of all of the early exit branches in that iteration.

In exemplary embodiments, a software technique is implemented such that the compiler overcomes a lack of knowledge about which storage is owened by this process so that instruction speculation can be enabled. Furthermore, a compiler analysis and a proper loop transformation are performed. Furthermore, an instruction schedule is generated to guarantee that there are no cross-page references within one loop iteration to avoid any potential protection violation, and the performance is improved through load speculation. In exemplary embodiments, the techniques are implemented for a loop with multiple array accesses. However, there can be a diminishing return if the different arrays are not aligned relative to each other.

In exemplary embodiments, the systems and methods described herein can be applied to the certain cases with non-stride accesses. If an address is owned by a process there is no reason to know that address a+n is also within the processes memory space, unless n is very small. In exemplary embodiments, the granularity of storage ownership is assessed to know that a small number of bytes ahead can be accessed. Since it is difficult in AIX, for example, to own a chunk of storage smaller than 1 page (4 k), it is possible to ascertain that the methods described herein are within a page and further ascertain that the remainder of that page (or cache line) can be accessed.

Figure 2:
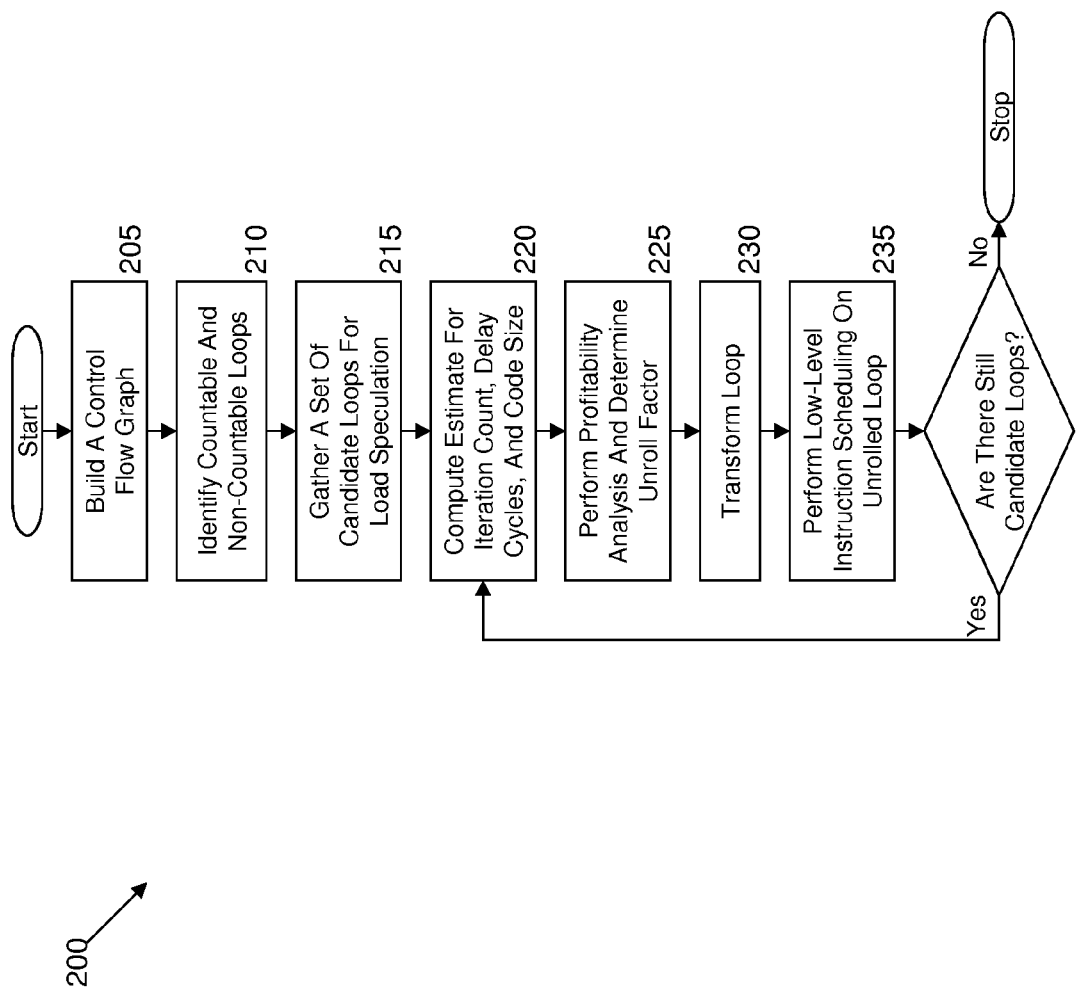
FIG. 2 illustrates a flow chart of a method for compiler support for aggressive safe load speculation.

FIG. 2 illustrates a flow chart of a method 200 for compiler support for aggressive safe load speculation. At step 205, the method 200 first builds a control flow graph. At step 210, the method then identifies both countable and non-countable loops. At step 215, the method gathers a set of candidate loops for load speculation. In exemplary embodiments, a loop is a candidate for load speculation: it is a loop with a early exit. Furthermore, the loop has stride-one accesses to memory. As discussed below, for each of the identified loops, the method 200 performs steps 220, 225, 230, 235 below. At step 220, the method 200 performs an estimate of the iteration count, delay cycles, and code size. At step 225, the method 200 performs a profitability analysis and determine an unroll factor based on delay cycles and code size. At step 230, the method 200 transforms the loop by generating a prologue loop to achieve data alignment and an unrolled main loop with loop directives, indicating which loads can safely be executed speculatively. At step 235, the method 200 performs low-level instruction scheduling on the unrolled main loop generated in step 230, which can make use of the information in the loop directives provided by step 230 to reorder appropriate loads and subsequent instructions with branches. At step 235, a safe, high-performance schedule is identified for the instructions in the loop.

The following discussion described high-level transformation in accordance with exemplary embodiments. The following is loop versioning using a run-time alignment check:

```
If (p% 4 == 0) {
    while (*p != 's') {
        p++;
        if (*p == 's') break;
        p++;
        if (*p == 's') break;
        p++;
        if (*p == 's') break;
        p++;
    }
} else {
    while (*p != 's')
        p++;
}
```

The code for the above loop that would result from implementing the methods described herein and is given by:

```
    while (*p != 's') {
        if (p % 4 == 0) goto mainLoopLabel:
        p++;
    }
    goto endLoopLabel;
mainLoopLabel:
    #pragma aligned_loop_load(*p)
    #pragma alignx (*p, 4)
    while (*p != 's') {
        p++;
        if (*p == 's') break;
        p++;
        if (*p == 's') break;
        p++;
        if (*p == 's') break;
        p++;
    }
endLoopLabel:
```

The above code represents a prologue loop and occupies the first four lines. Its job is to perform enough iterations of the loop so that p is strongly aligned in memory. In this example, the main loop is unrolled by four, so a strong enough alignment for p is sought so that the next four loads would be safe to execute together, for which p needs to be aligned to a number of bytes that is 4 times its own data size. In exemplary embodiments, the unroll factor is computed separately based on the following factors: the total delay cycles in a loop, estimated register pressure, estimated loop iteration count (the unroll factor should be at least smaller than half of estimated loop iteration count), ect. DataAlignment as UnrollFactor*DataElementSize is then computed.

The following code illustrates an example prior to high level transformation:

```
1575| lab__12:
  1582|   pszTmp = ((char *)val2 + 2);
  1584|   if (!((pszTmp->(unsigned short).rns0. != 0u)) goto lab__19;
       do {   /* id=4 guarded *//* ~17 */
          /* region = 34 */
          /* iv=0 oiv=0 base=0 final=0*/
          /* default-iter-count=100 min__cost=0 max__cost=0 */
          /* well-behaved */
  1585|     pszTmp = ((char *)pszTmp + 2);
  1584|   } while (pszTmp->(unsigned short).rns0. != 0u); /* ~17 */
       lab__19:
```

The following code illustrates an example after high-level transformation:

```
1575| lab__4:
  1582|   pszTmp = ((char *)val1 + 2);
  1584|   if (!((pszTmp->(unsigned short).rns1. != 0u)) goto lab__11;
       do {   /* id=5 guarded *//* ~9 */
          /* region = 33 */
          /* Residual */
          /* iv=0 oiv=0 base=0 final=0*/
          /* default-iter-count=100 min__cost=0 max__cost=0 */
          /* residue */
  1585|     if (!(7u & (unsigned) ((char *)2 + pszTmp))) goto lab__56;
          pszTmp = ((char *)pszTmp + 2);
  1584|   } while (pszTmp->(unsigned short).rns1. != 0u); /* ~9 */
       goto lab__11;
       lab__56:
       _alignx(8,((char *)2 + pszTmp))
       if (!1) goto lab__57;
       do {  /* id=3 guarded *//* ~58 */
          /* region = 0 */
          /* iv=0 oiv=0 base=0 final=0*/
          /* default-iter-count=100 min__cost=0 max__cost=0 */
          /* unroll__factor=1 */
          /* safe speculative load list = ( 171(align 8)) */
  1585|     pszTmp = ((char *)pszTmp + 2);
          if (!(pszTmp->(unsigned short).rns1. != 0u)) goto lab__57;
          pszTmp = ((char *)pszTmp + 2);
          if (!(pszTmp->(unsigned short).rns1. != 0u)) goto lab__57;
          pszTmp = ((char *)pszTmp + 2);
          if (!(pszTmp->(unsigned short).rns1. != 0u)) goto lab__57;
          pszTmp = ((char *)pszTmp + 2);
       } while (pszTmp->(unsigned short).rns1. != 0u); /* ~58 */
       lab__57:
  1584| lab__11:
```

In exemplary embodiments, after the loop with an early exit is identified, a prologue loop containing an alignment check, and a main loop with the leading load marked with its alignment are generated, which can be further improved by removing the alignment check. Loads can be safely speculated without alignment check if all memory accesses fall within a single page in memory can be shown, which can be done through loop versioning to check if the first load is aligned with page boundary and the total iteration count is less than the page size. Also, if the information about data alignment and size is available at compile time then no runtime check is needed.

The following discussion describes an interface between high level and low level optimizer and low-level instruction scheduling in accordance with exemplary embodiments. The main loop is annotated with safe load speculation with marked loads through ALIGNX and ALIGNED_LOOP_LOAD directives. In the low-level intermediate representation, the leading load instruction is annotated with the alignment information that is the result of the prologue loop.

Instruction Scheduling is a well-understood area of compiler technology. This component has the responsibility of finding the most advantageous ordering of the instructions in a program. Most scheduling algorithms, including the one used to implement the present invention, make use of a data structure called a Data Dependence Graph(DDG) to store information about which instruction reordering is legal and which is not.

The following example illustrates the loads that are to execute speculatively, which are those with the L2Z opcode (appearing on the left) that are in the extended basic block beginning with the label CL.58:

```
1584:   CL.9:
1584:       DIRCTIV residue
1585:       L4A      gr539=pszTmp(grauto,0)
1585:       LA       gr540=#AddressShadow(gr539,2)
1585:       N        gr541=gr540,0x7
1585:       CL4      cr542=gr541,0
1585:       BT       CL.56,cr542,0x4/eq ,
1585:       L4A      gr539=pszTmp(grauto,0)
1585:       LA       gr540=#AddressShadow(gr539,2)
1585:       ST4A     pszTmp(grauto,0)=gr540
1584:       L4A      gr539=pszTmp(grauto,0)
1584:       L2Z      gr543=(unsigned short).rns0.(gr539,0)
1584:       CL4      cr544=gr543,0
1584:       BF       CL.9,cr544,0x4/eq ,
1584:       B        CL.11.-1
1584:   CL.56:
1584:       L4A      gr539=pszTmp(grauto,0)
1584:   CL.58:
1584:       DIRCTIV dont__unroll
1585:       L4A      gr539=pszTmp(grauto,0)
1585:       LA       gr540=#AddressShadow(gr539,2)
1585:       ST4A     pszTmp(grauto,0)=gr540
1585:       L4A      gr539=pszTmp(grauto,0)
1585:       L2Z      gr545=(unsigned short).rus0.(gr539,0,align='1000')
1585:       CL4      cr546=gr545,0
1585:       BT       CL.57,cr546,0x4/eq ,
1585:       L4A      gr539=pszTmp(grauto,0)
1585:       LA       gr540=#AddressShadow(gr539,2)
1585:       ST4A     pszTmp(grauto,0)=gr540
1585:       L4A      gr539=pszTmp(grauto,0)
1585:       L2Z      gr543=(unsigned short).rns0.(gr539,0)
1585:       CL4      cr544=gr543,0
1585:       BT       CL.57,cr544.0x4/eq ,
1585:       L4A      gr539=pszTmp(grauto,0)
1585:       LA       gr540=#AddressShadow(gr539,2)
1585:       ST4A     pszTmp(grauzo,0)=gr540
1585:       L4A      gr539=pszTmp(grauto,0)
1585:       L2Z      gr543=(unsigned short).rns0.(gr539,0)
1585:       CL4      cr544=gr543,0
1585:       BT       CL.57.cr544,0x4/eq ,
1585:       L4A      gr539=pszTmp(grauto,0)
1585:       LA       gr540=#AddressShadow(gr539,2)
1585:       ST4A     pszTmp(grauto,0)=gr540
1585:       L4A      gr539=pszTmp(grauto,0)
1585:       L2Z      gr543=(unsigned short).rns0.(gr539,0)
1585:       CL4      cr544=gr543,0
1585:       BF       CL.58,cr544,0x4/eq ,
1585:   CL.57:
```

In exemplary embodiments, these loads are moved up to the top of that block. For the last three of these this movement means reordering them with at least one branch. Ordinarily the DDG would be annotated in a way to prevent this motion because it is not known if executing those loads before the branch causes a program exception or not. In exemplary embodiments, the usual instruction scheduler is modified in a way that these annotations are removed from the graph. The alignment annotation on the first load in that block allows for this modification: the subsequent loads are all from the same aligned block as the first load, so they are safe to execute. The scheduled code resulting from this is shown as follows:

```
1584|           CL.11:
1587|0000E0 subf   7C054050 1   S       gr0=gr8,gr5
1587|0000E4 srawi  7C000E70 1   SRA4CA  gr0,ca=gr0,1
1587|0000E8 addze  7FA00194 1   ADDE    gr29,ca=gr0,0,ca
1575|           @3:
1578|0000EC addi   38000000 1   LI      gr0=0
1576|0000F0 cmpwi  2C070000 1   C4      cr0=gr7,0
1576|0000F4 bc     418200B8 1   BT      @6,cr0,0x4/eq ,taken=30%(30,70)
1582|0000F8 addi   39270002 2   AI      gr9=gr7,2
1576|0000FC lhz    A1070000 1   L2Z     gr8=(unsigned short).rns0.(gr7,0)
1576|000100 cmpwi  2C080000 2   C4      cr0=gr8,0
1576|000104 bc     418200A8 1   BT      @6,cr0,0x4/eq ,taken=50%(0,0)
1584|000108 lhz    A0070002 1   L2Z     gr0=(unsigned short).rns0.(gr7,2)
1585|100010C addi  39470004 1   AI      gr10=gr7,4
    0|000110 ori   61280000 1   LR      gr8=gr9
1584|000114 cmpwi  2C800000 1   C4      cr1=gr0,0
1585|000118 andi.  71400007 1   RN4_R   gr0,cr0=gr10,0,0x7
1584|00011C bc     41860084 0   BT      CL.19,cr1,0x4/eq ,taken=20%(20,80)
1585|000120 bc     41820030 1   BT      CL.208,cr0,0x4/eq ,taken=20%(20,80)
1585|000124 ori    60000000 3
1585|000128 ori    60000000 1
1585|00012C ori    60000000 1
   0|           CL.268:
1585|000130 ori    61490000 1   LR      gr9=gr10
1584|000134 lhz    A0080002 1   L2Z     gr0=(unsigned short).rns0.(gr8,2)
1584|000138 addi   39080002 1   AI      gr8=gr8,2
1585|00013C addi   394A0002 1   AI      gr10=gr10,2
1584|000140 cmpwi  2C000000 1   C4      cr0=gr0,0
1584|000144 bc     4182005C 1   BT      CL.19,cr0,0x4/eq ,taken=20%(20,80)
1585|000148 andi.  71400007 2   RN4_R   gr0,cr0=gr10,0,0x7
   0|00014C bc     4082FFE4 1   BF      CL.268,cr0,0x4/eq ,taken=80%(80,20)
1585|           CL.208:
1585|000150 addi   38090006 1   AI      gr0=gr9,6
1584|000154 ori    61280000 1   LR      gr8=gr9
1585|000158 addi   39490004 1   AI      gr10=gr9,4
1585|00015C ori    60000000 1
1584|           CL.55:
1585|000160 lhz    A1880006 1   L2Z     gr12=(unsigned short).rn0.(gr8,6)
1585|000164 lhz    A3C80004 1   L2Z     gr30=(unsigned short).rns0.(gr8,4)
1585|000168 lhz    A1680002 1   L2Z     gr11=(unsigned short).rns0.(gr8,2,align='1000')
1585|00016C lhz    A3E80008 1   L2Z     gr31=(unsigned short).rns0.(gr8,8)
1585|000170 cmpwi  2C8C0000 1   C4      cr1=gr12,0
1585|000174 cmpwi  2F9E0000 1   C4      cr7=gr30,0
1585|000178 cmpwi  2C0B0000 1   C4      cr0=gr11,0
1585|00017C cmpwi  2F1F0000 1   C4      cr6=gr31,0
1585|000180 bc     41820130 0   BT      CL.204,cr0,0x4/cq ,taken=20%(20,80)
1585|000184 addi   39280008 2   AI      gr9=gr8,8
1585|000188 bc     419E0120 0   BT      CL.205,cr7,0x4/eq ,taken=20%(20,80)
1585|00018C bc     41860114 1   BT      CL.206.cr1,0x4/eq ,taken=20%(20,80)
1584|000190 ori    61280000 3   LR      gr8=gr9
1585|000194 addi   39490004 1   AI      gr10=gr9,4
1585|000198 addi   38090006 1   AI      gr0=gr9,6
1585|00019C bc     409AFFC4 0   BF      CL.55.cr6,0x4/eq ,taken=80%(80,20)
1584|           CL.19:
```

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for aggressive safe load speculation for a compiler in a computer system, the method consisting of:
   building a control flow graph;
   identifying both countable and non-countable loops;
   gathering a set of candidate loops for load speculation;
   for each candidate loop in the set of candidate loops gathered for load speculation performing:
      computing an estimate of the iteration count, total delay cycles in a loop, and code size;

performing a profitability analysis and determining an unroll factor based on the total delay cycles in the loop, estimated register pressure, and estimated loop iteration count, wherein the unroll factor is at least smaller than half of the estimate loop iteration count and the code size;

transforming the loop by generating a prologue loop to achieve data alignment and an unrolled main loop with loop directives, indicating which loads can safely be executed speculatively, wherein loop directives are implemented to reorder loads with branches; and performing low-level instruction scheduling on the generated unrolled main loop, wherein a loop with an early exit is a candidate loop for load speculation and has stride-one accesses to memory, for a leading load with a data element size, that is aligned with its data alignment, that is bigger than the data element size, there are a number of subsequent data accesses equal to a quotient of the data alignment and the data element size, minus one, which are safe for load speculation;

for a loop with early exit and with unit-stride accesses of a contiguous storage, performing:

determining whether a storage accessed by a first load has an alignment greater than its own data element size;

determining whether the alignment amount is less than the size of one memory page; and responsive to a determination that the storage accessed by the first load has an alignment greater than its own data element size and that the alignment amount is less than the size of one memory page, generating a pre-loop having exactly enough of a number of iterations of the original loop so that when the original loop is executed, the data for the first load is strongly aligned in storage so that the main loop can be unrolled and the first load has strong enough alignment so that all of the subsequent loads in that unrolled iteration can be safely executed ahead of all of the early exit branches in that iteration.

2. A system for aggressive safe load speculation for a compiler, the system comprising:

a computer processor having a memory coupled to the compiler;

a process residing in the memory having instructions for:

building a control flow graph;

identifying both countable and non-countable loops;

gathering a set of candidate loops for load speculation;

for each candidate loop in the set of candidate loops gathered for load speculation performing:

computing an estimate of the iteration count, total delay cycles in a loop, and code size;

performing a profitability analysis and determining an unroll factor based on the total delay cycles in the loop, estimated register pressure, and estimated loop iteration count, wherein the unroll factor is at least smaller than half of the estimate loop iteration count and the code size;

transforming the loop by generating a prologue loop to achieve data alignment and an unrolled main loop with loop directives, indicating which loads can safely be executed speculatively, wherein loop directives are implemented to reorder loads with branches; and performing low-level instruction scheduling on the generated unrolled main loop, wherein a loop with an early exit is a candidate loop for load speculation and has stride-one accesses to memory;

for a leading load with a data element size, that is aligned with its data alignment, that is bigger than the data element size, there are a number of subsequent data accesses equal to a quotient of the data alignment and the data element size, minus one, which are safe for load speculation;

for a loop with early exit and with unit-stride accesses of a contiguous storage, performing:

determining whether a storage accessed by a first load has an alignment greater than its own data element size;

determining whether the alignment amount is less than the size of one memory page; and responsive to a determination that the storage accessed by the first load has an alignment greater than its own data element size and that the alignment amount is less than the size of one memory page, generating a pre-loop having exactly enough of a number of iterations of the original loop so that when the original loop is executed, the data for the first load is strongly aligned in storage so that the main loop can be unrolled and the first load has strong enough alignment so that all of the subsequent loads in that unrolled iteration can be safely executed ahead of all of the early exit branches in that iteration.

* * * * *